United States Patent
Aasbø et al.

(10) Patent No.: US 6,737,097 B1
(45) Date of Patent: May 18, 2004

(54) SILAGE AID, PROCESS FOR PREPARING THIS SILAGE AID AND USE OF THIS SILAGE AID

(75) Inventors: Kari Aasbø, Skien (NO); Harald Breivik, Skjelsvik (NO)

(73) Assignee: Norsk Hydor ASA, Oslo (NO)

( * ) Notice: Subject to any disclaimer, the term of this patent is extended or adjusted under 35 U.S.C. 154(b) by 0 days.

(21) Appl. No.: 09/936,165

(22) PCT Filed: Mar. 6, 2000

(86) PCT No.: PCT/NO00/00079

§ 371 (c)(1),
(2), (4) Date: Dec. 7, 2001

(87) PCT Pub. No.: WO00/53033

PCT Pub. Date: Sep. 14, 2000

(30) Foreign Application Priority Data

Mar. 8, 1999 (NO) .......................................... 19991111

(51) Int. Cl.$^7$ ................................................. A23K 3/03
(52) U.S. Cl. ........................ 426/541; 426/544; 426/654
(58) Field of Search ................................ 426/541, 544, 426/654, 805

(56) References Cited

U.S. PATENT DOCUMENTS

| | | | |
|---|---|---|---|
| 3,284,212 A | * 11/1966 | Talmadge et al. ............. | 426/64 |
| 4,592,915 A | 6/1986 | Goyette et al. ............. | 426/321 |
| 4,915,876 A | 4/1990 | Lindsay ................... | 260/398.5 |

FOREIGN PATENT DOCUMENTS

| | | |
|---|---|---|
| CN | 1059454 | 3/1992 |
| DK | 141922 | 7/1980 |
| JP | 57189649 | 11/1982 |
| NO | 155723 | 2/1987 |
| SE | 455754 | 8/1988 |
| SU | 1449095 | 1/1989 |
| WO | 9937168 | 7/1999 |

OTHER PUBLICATIONS

Abstract of Shaw et al., "Growth/performance and meat quality of broiler chicks fed with fermented poultry intestine silage", International Journal of Animal Sciences, vol. 12, No. 2 (1997), pp. 221–224.

Austreng et al., "Syrekonservering av fórsik", Norsk Fiskeoppdrett, vol. 4, (1979), pp. 4–7.

STN International, File CAPLUS, CAPLUS accession No. 1989:532957, Document No. 111:132957, Bashkir Scientific–Research and Design–Technological Institute of Livestock Breeding and Feed Production: "Silage preservative containing agidol, orthophosphoric acid, and formic acid". SU1449095, Jan. 1989.

STN International, File CAPLUS, CAPLUS accession No. 1992:549879, Document No. 117:149879, Peop. Rep. China.: "Long–lasting fungicide compositions for feed preservation". Pat # CN 1059454, Mar. 1992.

STN International, File CAPLUS, CAPLUS accession No. 1999:134258, Document No. 130:351563, White, M.B. et al.: "Digestibility by mink and storage stability of feedstuffs made from raw ground, acid–treated or fermented dorfish (*Scualus acanthias*)". Can. J. Anim. Sci. vol. 78 (4), p. 633–40, 1998.

STN International, File CAPLUS, CAPLUS accession No. 1975:546002, Document No. 83:146002, Jensen, Preben Moeller: "Production and use of fish". Beret. Statens Husdyrbrugstors, vol. 427, pp. 1–79, 1975.

M. B. White et al., "Digestibility by mink and storage stability of feedstuffs made from raw ground, acid–treated or fermented dogfish (*Squalus acanthias*)", Can. J. Anim. Sci., 78(4), 633–640, 1998.

* cited by examiner

*Primary Examiner*—C. Sayala
(74) *Attorney, Agent, or Firm*—Wenderoth, Lind & Ponack, L.L.P.

(57) ABSTRACT

This invention relates to a new silage aid, process for preparation of this silage aid and use of the silage aid. The silage aid comprises at least one antioxidant selected from the group 2,6-di-tert-butyl-4-methylphenol (BHT), 3-tert-butyl-4-hydroxyanisole (BHA), tert-butylhydroquinone (TBHQ), tocopherol and gallates; at least one short chain caboxylic acid; and optionally at least one salt of said acid. These andoxidants are food approve. The present silage aid is useful for preservation of organic by-products, and particularly for protection of fish oil during a fish silage process.

32 Claims, No Drawings

SILAGE AID, PROCESS FOR PREPARING THIS SILAGE AID AND USE OF THIS SILAGE AID

This application is a 371 application of PCT/NO00/00079 filed Mar. 6, 2000.

This invention relates to a new silage aid, process for preparation of this silage aid and use of the silage aid.

When preparing silage from for instance fish waste, the raw material is treated with acid to obtain the optimum pH (3.5–4.5) with regard to enzymatic hydrolysis, and to prevent the growth of bacteria during storage.

During the silage process hydrolysis results in the formation of emulsions made up of an acidic water phase, an oil phase and solids. The degree of phase separation in these systems depends upon the type of raw material used. Oxygen is easily transferred through water, which unfortunately gives rise to oxidative degradation of the oil phase. This lipid oxidation results, of course, in a reduced nutritional value of the oil as an ingredient both for feed and for food. Likewise, it implies a reduced quality of the oleochemicals made from fish silage oil. To overcome these problems it would be a great advantage if an antioxidant well suited for the protection of fish oil could be present during the silage process.

The most favourable way to include an antioxidant would be as a constituent of the silage aid. Generally, it would be necessary to have at least 1% antioxidant in the silage aid. Water soluble antioxidants are easily included in an acidic silage aid. Unfortunately though, these compounds will not be able to protect the oil after separation since they will not be associated with the oil phase. Furthermore, the antioxidants that are food approved in Europe and/or the US at present, are mainly fat soluble compounds. e.g. 2.6-di-tert-butyl-4-methylphenol(BHT), 3-tert-butyl-4-hydroxyanisole(BHA), tert-butylhydroquinone(TBHQ), tocopherol and the gallates. All of these food approved antioxidants are also commercially available in formulations with emulsifying agents, but unfortunately the emulsifying agents are in general hydrophobic and thus these formulations are not well suited to an acidic water medium.

The antioxidant ethoxyquin is an exception with regard to the properties described above. Ethoxyquin is a secondary cyclic amine. Hence, it is well known that ethoxyquin is soluble in acids at low pH (<3), as this implies protonation of the amino croup and thereby formation of a hydrophilic salt. As pH rises to 4–5 however, ethoxyquin will be deprotonated and consequently, will again become fat soluble. Thus, by choosing the proper concentration of acid it is possible to have ethoxyquin in the form of a hydrophilic salt in the silage aid, while during the silage process the salt is deprotonated, becomes fat soluble and consequently will be able to protect the oil against lipid oxidation. Likewise, other antioxidants with an amino group may be suitable for this use. The preparation of ethoxyquin formiate salt, and this salt dissolved in formic acid is disclosed in Norwegian patent application no. 851007.

Unfortunately though, ethoxyquin or other known antioxidants with an amino group, are not food approved. Therefore, when food approval has been required, no silage aid soluble antioxidants have been available to date.

Thus it is a main object of the present invention to provide a new silage aid comprising a food approved antioxidant.

This and other objects of the invention is achieved by the attached claims.

The invention will be further explained below.

The antioxidants BHT, BHA, tocopherol, TBHQ and propyl gallate(PG) are practically insoluble in water, and experiments have shown that their solubility in mineral acids (hydrogen chloride, sulphuric acid) is also quite low (see Table 1). Unexpectedly however, we have now found that these highly hydrophobic antioxidants are soluble in the short chain caboxylic acids formic, acetic and propionic acid (see Table 1). Further experiments have shown that when using a silage aid comprising BHA, TBHQ or PG dissolved in 85% formic acid, a superior quality of the fish oil product as compared to the product of the same process using only 85% formic acid (Table 2) is obtained. When the silage aid containing antioxidant is blended with the fish waste raw material, the hydrophobic antioxidant is associated with and protects the oil phase. Thus, we have found a method which is convenient on a technical scale and which leads to superior quality of the products of the silage process.

Generally, the amount of silage aid needed will depend upon the type of fish waste used and the choice of acid. Also, the amount of antioxidant needed may depend upon the raw material used or the requirements regarding the stability of the isolated oil. This implies that the required amount of antioxidant dissolved in the acid may vary.

Furthermore, we have shown by experiments that the solubility of BHT in formic acid increases when BHA is present in the acid. This was a surprising result.

The silage aid might further comprise additives like, anti-microbiell compounds (e.g. ethyl benzoate or benzoic acid), anti-fungal compounds, anti-corrosive compounds, chelating compounds (e.g. citric acid), compounds improving the handling properties (e.g. glycerol), and oxygen scavengers.

The present invention also comprises to firstly dissolve the said antioxidants in a short chain carboxylic acid, and subsequently adding a mineral acid in the purpose of decreasing pH.

The short chain carboxylic acids according to this invention might be used either alone or in combination with their corresponding salts. Further, the aforementioned acids might be used as a mixture or as a mixture together with any of their salts.

The present invention is documented by experiments performed for a fish silage process. This invention will of course also prevail for other processes where acidic preservation is used. Fish silage shall only be considered as an example. The invention is applicable in acidic preservation of other organic by-products like slaughter waste, poultry waste and food waste, as well.

TABLE 1

Solubility (weight %) of antioxidants in different acids.

| | BHA | TBHQ | PG | BHT | Tocopherol |
|---|---|---|---|---|---|
| 5 M hydrogen chloride[a] | <0.1% | <0.1% | <0.1% | <0.1% | <0.1% |
| 4 N sulphuric acid[a] | <0.1% | <0.1% | <0.1% | <0.1% | <0.1% |
| 85% formic acid[b] | >5% | >5% | >10% | <0.25% | <0.5% |
| 98–100% formic acid[b] | >10% | >10% | >10% | <0.25%[c] | <0.5% |
| 100% acetic acid[b] | >10% | >10% | >10% | >10% | >10% |

TABLE 1-continued

Solubility (weight %) of antioxidants in different acids.

|  | BHA | TBHQ | PG | BHT | Tocopherol |
|---|---|---|---|---|---|
| 100% propionic acid[b] | >10% | >10% | <10% | >10% | >10% |

[a]A mixture of antioxidant(40 mg) and mineral acid(40 g) was thoroughly shaken at 23° C.
[b]A mixture of the chosen amount of antioxidant(10–400 mg) and acid(4 g) was thoroughly shaken at 23° C.
[c]0.25% BHT is not soluble in formic acid. When 0.5% BHA is added to the formic acid. BHT is soluble.

Example I

Experimental Procedure for a Lab-scale Fish Silage Process

The raw material, Atlantic salmon viscera, was ground in a kitchen grinder, and the resulting minced fish waste was thoroughly blended before it was portioned into separate batches each containing 500 gram. Silage aid (2% vol./wt.; 10 mL) 85% formic acid with or without 0.75% wt./vol. of dissolved antioxidant was added, and the content of each batch was mixed to ensure a homogenous distribution. The batches was stored for eight days in an oven at 35±2° C. before a standard procedure for silage work up was conducted. This included warming the silage at 90±1° C. for 1 minute, tempering, and finally separating the oil after centrifugation. The isolated oils were analysed to determine the POV and p-AV. Furthermore, weight gain (at 35±1° C.) as a function of time was registered to determine the IP of the oils. The results are presented in Table 2.

Example II

Experimental procedure as in Example I, but the raw material in this series was whole herring. The results are presented in Table 2.

TABLE 2

Comparison of the results from analysis of various oil quality parameters[a], determined for fish silage oil produced[b] using silage aid with or without dissolved antioxidant.

| Example no. | Silage aid[c] | POV | p-AV | IP |
|---|---|---|---|---|
| I | Control: 85% HCOOH (formic acid) | 3 | 24 | 1 |
|  | 85% HCOOH incl. BHA (150 ppm) | 2 | 22 | 19 |
|  | 85% HCOOH incl. TBHQ (150 ppm) | 1 | 9 | 62 |
| II | Control: 85% HCOOH | 29 | 29 | 0 |
|  | 85% HCOOH incl. PG (150 ppm) | 7 | 19 | 4 |

[a]POV(Peroxide value, Ph. Eur. V.3.4.5); determines the amount of primary oxidation products, hydroperoxides, in the oil. p-AV(p-Anisidine value, IUPAC 2.504); determines the amount of some secondary oxidation products, alkenals, in the oil. IP(induction period); a measure of the shelf life of the oil, given as the number of days it takes before the oil shows detectable weight gain due to oxygen absorption.
[b]The experimental procedure for lab-scale silage experiments is given above in example I.
[c]The concentration of antioxidant given in parenthesis,is based on the amount of fish waste used in these experiments.

What is claimed is:

1. A silage aid comprising at least one antioxidant selected from the group consisting of 2,6-di-tert-butyl-4-methylphenol (BHT), 3-tert-butyl-4-hydroxyanisole (BHA), tert-butylhydroquinone (TBHQ), tocopherol and gallates, dissolved in at least one short chain carboxylic acid selected from the group consisting of formic acid, acetic acid and propionic acid; and optionally at least one salt of said acids.

2. A silage aid according to claim 1, wherein the short chain carboxylic acid is formic acid of concentration 60–100%.

3. A silage aid according to claim 2, wherein the concentration of formic acid is 83–98%.

4. A silage aid according to claim 1, wherein the short chain carboxylic acid is acetic acid or propionic acid of concentration 60–100%.

5. A silage aid according to claim 4, wherein the concentration of acetic acid or propionic acid is 80–100%.

6. A silage aid according to claim 1, wherein 0.1–10% of the antioxidant is dissolved in the short chain carboxylic acid.

7. A silage aid according to claim 6, wherein the concentration of antioxidant is 0.3–2%.

8. A silage aid according to claim 1, comprising an antioxidant selected from the group consisting of BHA, TBHQ and propyl galate (PG); and formic acid.

9. A silage aid according to claim 1, comprising BHA and BHT; and formic acid.

10. A process for preparation of a silage aid comprising at least one antioxidant selected from the group consisting of 2,6-di-tert-butyl-4-methylphenol (BHT), 3-tert-butyl-4-hydroxyanisole (BHA), tert-butylhydroquinone (TBHQ), tocopherol and gallates; at least one short chain carboxylic acid selected from the group consisting of formic acid, acetic acid and propionic acid; and optionally at least one salt of said acids, which comprises dissolving at least one of the antioxidants in at least one of the acids.

11. A process according to claim 10, wherein 0.1–10% of the antioxidant is dissolved in a short chain carboxylic acid of concentration 60–100%.

12. A process according to claim 11, wherein the concentration of antioxidant is 0.3–2%.

13. A process according to claim 10, wherein 0.1–10% of the antioxidant is dissolved in formic acid, acetic acid and/or propionic acid of concentration 60–100%.

14. A process according to claim 13, wherein the concentration of antioxidant is 0.3–2%.

15. A process according to claim 10, for preparation of a silage aid comprising 2,6-di-tert-butyl-4-methylphenol (BHT) and 3-tert-butyl-4-hydroxyanisole (BHA), and formic acid, which comprises
 a) dissolving BHA in the acid, and
 b) subsequently, dissolving BHT in the solution obtained in step a).

16. A method for protection of fish oil during a fish silage process, which comprises incorporating into the silage a silage aid comprising at least one antioxidant selected from the group consisting of 2,6-di-tert-butyl-4-methylphenol (BHT), 3-tert-butyl-4-hydroxyanisole (BHA), tert-butylhydroquinone (TBHQ), tocopherol and gallates, dissolved in at least one short chain carboxylic acid selected from the group consisting of formic acid, acetic acid and propionic acid; and optionally at least one salt of said acids.

17. A method of preservation of organic by-products which comprises incorporating into the by-products a silage aid comprising at least one antioxidant selected from the group consisting of 2,6-di-tert-butyl-4-methylphenol (BHT), 3-tert-butyl-4-hydroxyanisole (BHA), tert-butylhydroquinone (TBHQ), tocopherol and gallates, dissolved in at least one short chain carboxylic acid selected from the group consisting of formic acid, acetic acid and propionic acid; and optionally at least one salt of said acids.

18. A silage aid according to claim 2, wherein 0.1–10% of the antioxidant is dissolved in the short chain carboxylic acid.

19. A silage aid according to claim 18, wherein the concentration of antioxidant is 0.3–2%.

20. A silage aid according to claim 4, wherein 0.1–10% of the antioxidant is dissolved in the short chain carboxylic acid.

21. A silage aid according to claim 20, wherein the concentration of is 0.3–2%.

22. A silage aid according to claim 2, comprising an antioxidant selected from the group consisting of BHA, TBHQ and propyl galate (PG); and formic acid.

23. A silage aid according to claim 4, comprising an antioxidant selected from the group consisting of BHA, TBHQ and propyl galate (PG); and formic acid.

24. A silage aid according to claim 6, comprising an antioxidant selected from the group consisting of BHA, TBHQ and propyl galate (PG); and formic acid.

25. A silage aid according to claim 2, comprising BHA and BHT; and formic acid.

26. A silage aid according to claim 4, comprising BHA and BHT; and formic acid.

27. A silage aid according to claim 6, comprising BHA and BHT; and formic acid.

28. A silage aid according to claim 8, comprising BHA and BHT; and formic acid.

29. A process according to claim 11, wherein 0.1–10% of the antioxidant is formic acid, acetic acid and/or propionic acid of concentration 60–100%.

30. A process according to claim 29, wherein the concentration of antioxidant is 0.3–2%.

31. A process according to claim 11, for preparation of a silage aid comprising 2,6-di-tert-butyl-4-methylphenol (BHT) and 3-tert-butyl-4-hydroxyanisole (BHA), and formic acid, which comprises
   a) dissolving BHA in the acid, and
   b) subsequently, dissolving BHT in the solution obtained in step a).

32. A process according to claim 13, for preparation of a silage aid comprising 2,6-di-tert-butyl-4-methylphenol (BHT) and 3-tert-butyl-4-hydroxyanisole (BHA), and formic acid, which comprises
   a) dissolving BHA in the acid, and
   b) subsequently, dissolving BHT in the solution obtained in step a).

* * * * *